J. F. STEVENSON.
CAR FOR MONORAILWAYS.
APPLICATION FILED DEC. 29, 1917.
1,257,146.
Patented Feb. 19, 1918.
Fig. 1
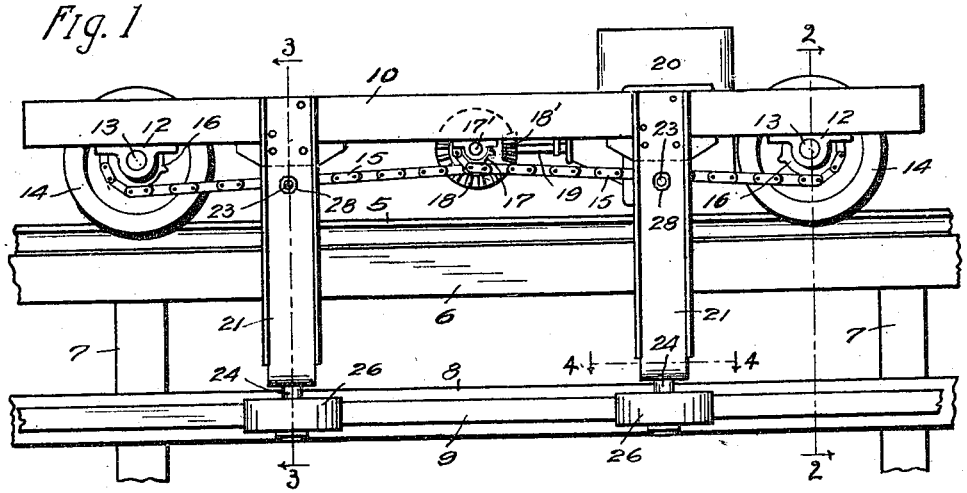
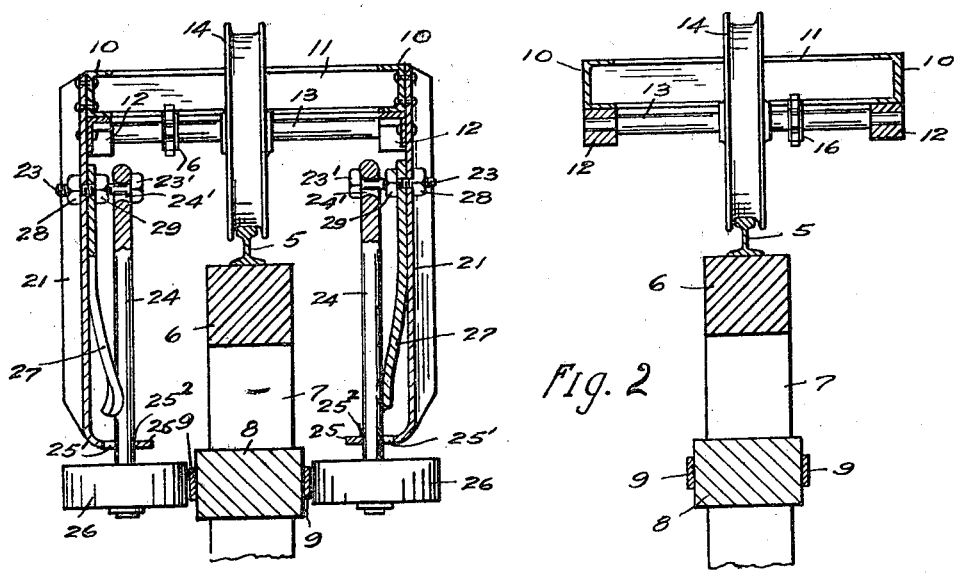
Fig. 2
Fig. 3
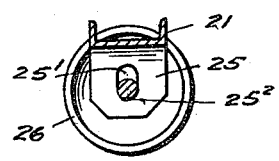
Fig. 4
INVENTOR:
John F. Stevenson
BY
Pierre Barnes
ATTORNEY

UNITED STATES PATENT OFFICE.

JOHN F. STEVENSON, OF SEATTLE, WASHINGTON, ASSIGNOR, BY DIRECT AND MESNE ASSIGNMENTS, OF ONE-HALF TO WILLIAM H. SHEPARD AND ONE-HALF TO PIERRE BARNES, BOTH OF SEATTLE, WASHINGTON.

CAR FOR MONORAILWAYS.

1,257,146.　　　　Specification of Letters Patent.　　Patented Feb. 19, 1918.

Application filed December 29, 1917.　Serial No. 209,384.

*To all whom it may concern:*

Be it known that I, JOHN F. STEVENSON, a citizen of the United States, residing at Seattle, in the county of King and State of Washington, have invented certain new and useful Improvements in Cars for Monorailways, of which the following is a specification.

This invention relates to cars or trucks for monorailways, and its object is the perfecting of vehicles of this character and, more especially, the provision of devices which serve to maintain the same in upright position.

The invention is illustrated in the accompanying drawings, in which—

Figure 1 is a side elevation of a monorail track structure and a car embodying my invention. Figs. 2 and 3 are transverse vertical sections taken substantially through 2—2 and 3—3 of Fig. 1. Fig. 4 is a detail horizontal sectional view through 4—4 of Fig. 1.

The reference numeral 5 designates a track rail secured upon a girder piece 6 which is supported by posts 7, the latter having secured thereto stringers 8 to which guide rails 9 are secured. As shown, the car is formed of a body frame comprising longitudinal side members 10 and transverse members 11 rigidly secured together. Adjacent to the ends of said body are journal boxes 12 for the axles 13 of supporting wheels 14 which travel on the track-rail 5.

In the drawings, said supporting wheels are shown as traction wheels being driven by chains 15 passing about sprocket wheels 16 on the respective axles from sprocket wheels, such as 17, mounted on a transverse shaft $17^1$ which, in turn, is driven by gear wheels 18, $18^1$ from the shaft 19 of a motor 20.

Rigidly secured to said body frame and depending therefrom at each side of the car is one or more hangers 21, two being shown. Each of said hangers are formed or provided at their lower ends with an arm 25 extending toward the track structure.

Extending transversely through apertures provided in each of said hangers and in proximity to the body frame is a headed bolt 23 which passes through an eye $24^1$ provided in the upper end of an upright bar 24 to suspend the latter. These bars extend through elongated holes $25^1$ provided in the respective hanger arms 25 and therebelow are provided with journals for guide wheels 26 disposed opposite the adjacent guide rails 9.

27 represent plate springs, one for each hanger, and serve to yieldingly hold the axle bars 24 against the inner ends $25^2$ of the respective arm holes $25^1$. Said springs are supported by the provision of a hole near the upper end of each to receive the hanger bolts 23. These bolts are screw-threaded for nuts 28 and 29 by which the upper end of the springs are clamped to the hangers and also act to secure the bolts firmly to the hangers, while the nuts 29 and the bolt heads $23^1$ serve to limit the movement of the upper ends of the axle bars.

The holes $25^1$ of the hanger arms 25 are disposed so that the axle bars 24 when urged by the associated springs 27 against the ends $25^2$ of the holes, will cause the wheels 26 to be held so that their peripheries will not contact with the side rails 9 or, at least, barely touch the same when the car is in upright position.

When the car tilts in one lateral direction or the other, it causes the spring-pressed wheels 26 at the side toward which the car leans to act counterwise to restore the car into its upright position.

What I claim is—

1. In a monorail car, the combination with the body frame, supporting wheels therefor, and means to drive said wheels, of hangers rigidly secured to and depending from the side members of said frame, horizontal arms extending from the lower ends of said hangers, said arms being each provided with an elongated hole, upright axle bars swingably connected to the respective hangers adjacent to the frame and extending through said arm holes, a guide wheel journaled on each of said axle bars below the respective arms, and springs interposed between the associated hangers and axle bars to cause the latter to be yieldingly held against the ends of the holes remote from the respective hangers.

2. A monorail car having a body frame, supporting wheels therefor, hangers depending from opposite sides of said body and rigidly secured thereto, apertured arms provided on said hangers, guide wheels, axles of said guide wheels, said axles extending through said arms, a spring interposed between each of said hangers and the associated axle, bolts secured to the hangers in proximity to said frame for supporting said springs and the axles and the wheels thereon, and means for securing said bolts to the hangers, said means also serving to rigidly secure an end of each of the springs to the adjacent hangers.

3. A monorail car having a body frame, a hanger rigidly secured thereto, an axle bar connected from its upper end to said hanger in proximity to said frame and extending through a guide arm provided at the lower end of the hanger, a wheel journaled on the axle bar below said arm, and a spring interposed between the hanger and said axle bar to yieldingly retain the latter at a distance from the hanger as regulated by said guide arm.

4. The combination with a monorail track having a track rail and two spaced guide rails therebelow, of a car having a frame, supporting wheels therefor mounted on said track rail, hangers rigidly connected to and depending from said frame at opposite sides of said track rail, axles depending from the respective hangers adjacent to said frame, said hangers being formed to afford limited lateral swinging movements to said axles, guide wheels journaled on the lower ends of said axles, and springs interposed between the hangers and the respective axles to yieldingly hold the guide wheels at their innermost positions as limited by said hangers and with respect to said guide rails.

Signed at Seattle, Washington, this 21st day of December, 1917.

JOHN F. STEVENSON.

Witnesses:
PIERRE BARNES,
E. PETERSON.

Copies of this patent may be obtained for five cents each, by addressing the "Commissioner of Patents, Washington, D. C."